United States Patent
Goodman (10) Patent No.: US 8,344,944 B2
(45) Date of Patent: Jan. 1, 2013

(54) METHOD AND SYSTEM FOR CONTINUOUS WAVE INTERFERENCE SUPPRESSION IN PULSED SIGNAL PROCESSING

(75) Inventor: Vernon R Goodman, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 236 days.

(21) Appl. No.: 12/848,663

(22) Filed: Aug. 2, 2010

(65) Prior Publication Data

US 2012/0026031 A1 Feb. 2, 2012

(51) Int. Cl.
*G01S 13/00* (2006.01)
*G01S 13/08* (2006.01)
*G01S 13/58* (2006.01)

(52) U.S. Cl. .......... 342/159; 342/89; 342/104; 342/115; 342/194

(58) Field of Classification Search ............. 342/89, 342/104, 115, 159, 194
See application file for complete search history.

(56) References Cited

U.S. PATENT DOCUMENTS

| | | | | |
|---|---|---|---|---|
| 4,528,565 | A * | 7/1985 | Hauptmann | 342/91 |
| 7,737,881 | B2 * | 6/2010 | Stove | 342/93 |
| 7,764,222 | B2 * | 7/2010 | Tyree et al. | 342/89 |
| 2004/0155812 | A1 * | 8/2004 | Pleva et al. | 342/74 |
| 2007/0164898 | A1 * | 7/2007 | Pan et al. | 342/104 |
| 2011/0090939 | A1 * | 4/2011 | Diener et al. | 375/136 |

* cited by examiner

*Primary Examiner* — Jack W Keith
*Assistant Examiner* — Peter Bythrow
(74) *Attorney, Agent, or Firm* — Cantor Colburn LLP (57) ABSTRACT

A System and Method for CW interference suppression in pulsed signal processing having a front-end, an A/D converter, a data store, and a suppressor module coupled to both the A/D converter and the data store. The front-end is operable to receive a waveform and communicate such to the A/D converter to digitize for processing by the suppressor module. The suppressor module being operable to further process the digitized waveform by way of applying a FFT to obtain a corresponding amplitude spectrum of the digitized waveform, clipping the amplitude spectrum to obtain a clipped amplitude spectrum, performing successive piece-wise IFFTs on the positive frequency points of the clipped amplitude spectrum to obtain multiple amplitude-time series, each having a frequency value assigned, and then stacking such amplitude-time series successively in the data store to form a time-frequency spectrogram array to thereby facilitate suppression of interference signals and detection of data pulses.

20 Claims, 7 Drawing Sheets

METHOD AND SYSTEM FOR CONTINUOUS WAVE INTERFERENCE SUPPRESSION IN PULSED SIGNAL PROCESSING

TECHNICAL FIELD OF THE DISCLOSURE

This disclosure relates generally to a pulsed signal processing method and system. More particularly, this disclosure relates to a method and system for suppressing continuous wave interference signals in pulsed signal processing.

BACKGROUND OF THE DISCLOSURE

Interference signals are a major problem in the field of electronic communication signals and, in particular, with radar systems. Coming up with new and improved processes and solutions to sort out the unwanted interference signals from the desired signals is a continuing pursuit in the signal processing industry. Continuous Wave (CW) interference is one form of interference signal that is typically encountered in a number of Radio Frequency (RF) bands where radar systems operate. The presence of heavy CW interference in these RF bands is created in large part from commercial radio, TV, and cellular telephone transmissions.

In general, CW interference signals introduce a large average power presence into the radar system's passband as compared to the low average power of the desired radar pulses. This results in the desired pulses having a low signal-to-noise ratio (SNR) which makes detection difficult. With the need for a signal-to-noise ratio of 16-18 db typically required to detect and characterize pulses accurately, standard wideband video detectors are not able to successfully detect pulses on a consistent basis.

Therefore, in order for radar systems to maintain a high level of proper pulse detection, the CW interference signals must first be suppressed before further signal processing can take place. This suppression must be performed efficiently in order to keep the required computational resources to a minimum. Currently, CW interference signals are typically being dealt with through the use of a variety of known CW Interference Suppression (CWIS) techniques based in the frequency domain. Some typical applications are in the Intelligence, Surveillance and Reconnaissance (ISR) field where there is a need to detect various radar pulses in the midst of heavy CW interference. Generally, these CW interference suppression techniques operate to pre-process the data and allow pulse detection via matched detection matrices. However, such techniques are all generally very time-intensive requiring very large signal processing systems having special hardware for handling the heavy demand on computational resources.

In view of such, current CW interference suppression techniques are typically not adequate for all of today's CW interference suppression applications. Embedded systems are one such type of application where there is a growing demand for new and improved techniques for accomplishing CW interference suppression. Embedded systems are generally much smaller in hardware size having very limited computational resources as compared to the large signal processing systems that have typically employed CW interference suppression capabilities. Hence, current frequency domain based CW interference suppression techniques are just simply too compute intensive and too computational resource demanding for use in embedded systems.

Other CW interference suppression techniques have been employed utilizing digitized waveforms, Fast Fourier Transforms (FFTs) and Inverse Fast Fourier transforms (IFFTs) to operate on and process the signals. However, current CW interference techniques as such employed to digitally process the signals have exhibited problems with the Gibbs Phenomenon. The Gibbs Phenomenon occurs when processing signals that are not infinitely long. Generally, the Gibbs Phenomenon manifests itself in the form of false signal detections, ringing at the ends of pulses, and creation of new pulses which aren't actually present in the sensed signal by way of inter-pulse ringing and wrap-around effects. In short, the current CW interference suppression techniques known today in the industry employing digital processing and the use of FFTs, inherently carry a two-fold problem of distorted detected pulses and false detections. As a result, CW interference suppression techniques employed in the current systems of today simply live with these inherent problems and deal with them later through further post-processing the data.

Accordingly, there exists a long felt need for an improved CW interference suppression and pulse detection method and system that alleviates the inherent problems known in CW interference suppression systems currently being employed in the signal processing industry; and which is better suited for use in embedded system applications where computational resources are limited.

SUMMARY OF THE DISCLOSURE

According to one embodiment of the present disclosure, a system for continuous wave interference suppression in pulsed signal processing is presented having a front-end, an A/D converter, a data store, and a suppressor module coupled to both the A/D converter and the data store. The front-end being operable to receive a waveform and communicate such to the A/D converter to digitize it for processing by the suppressor module. The suppressor module being generally operable to further process the digitized waveform by way of applying a FFT to obtain a corresponding amplitude spectrum of the digitized waveform, clipping the amplitude spectrum to obtain a clipped amplitude spectrum, performing an IFFT on the positive frequency points of the clipped amplitude spectrum to obtain a number of amplitude-time series, each having a frequency value assigned, and then stacking such amplitude-time series successively in the data store to form a time-frequency spectrogram array thereby facilitating suppression of the interference signals and enhancing subsequent detection of desired data pulses.

In one embodiment of the present disclosure, the IFFT is performed in a piece-wise manner comprised of first dividing the clipped amplitude spectrum into a plurality of frequency bins, each having a center frequency, performing an IFFT on the positive frequency points within each frequency bin to obtain an amplitude-time series for each frequency bin, and then assigning each amplitude-time series a frequency value equal to the center frequency of the frequency bin from which it resulted.

Accordingly, some embodiments of the disclosure may provide numerous technical advantages. Some embodiments may benefit from some, none or all of these advantages. For example, a technical advantage of one embodiment of the disclosure may be an improved faster system and method for CW interference suppression in pulsed signal processing that requires much less computational resources and is better suited for embedded system applications. Furthermore, a faster method utilizing an approximation technique, such as described herein reduces the number of computations required to process the waveform thereby allowing for fewer and smaller sized computational resources to do the job. Another embodiment may provide for a more efficient combined CW interference suppression and pulse detection method that takes advantage of certain characteristics of the IFFT and the time-frequency domain spectrogram to achieve fast detection of medium Signal-To-Noise-Ratio pulses in the presence of heavy CW interference. Known systems employing CW interference suppression are just not feasible for small embedded tactical applications where compute power is limited due to having reduced computational resources on hand.

Another example of a potential technical advantage of one embodiment of the present disclosure is that it may alleviate the inherent problems associated with the Gibbs Phenomenon, which necessitates additional post-processing of the data to remove false pulse detections as well as distortions to desired pulses. Many current CW interference suppression systems simply live with these false detections and distortion problems and commit additional computational resources to remove such after detection.

Although specific advantages have been disclosed hereinabove, it will be understood that various embodiments may include all, some, or none of the disclosed advantages. Additionally, other technical advantages not specifically cited may become apparent to one of ordinary skill in the art following review of the ensuing drawings and their associated detailed description. The foregoing has outlined rather broadly some of the more pertinent and important advantages of the present disclosure in order that the detailed description of the disclosure that follows may be better understood so that the present contribution to the art can be more fully appreciated. It should be appreciated by those skilled in the art that the conception and the specific embodiment disclosed may be readily utilized as a basis for modifying or designing other structures for carrying out the same purposes of the present disclosure. It should also be realized by those skilled in the art that such equivalent constructions do not depart from the spirit and scope of the present disclosure as set forth in the appended claims.

BRIEF DESCRIPTION OF THE DRAWINGS

For a fuller understanding of the nature and possible advantages of the present disclosure, reference should be had to the following detailed description taken in connection with the accompanying drawings in which.

Similar reference characters refer to similar parts throughout the several views of the drawings.

DETAILED DESCRIPTION OF THE EXAMPLE EMBODIMENTS

Figure 1:
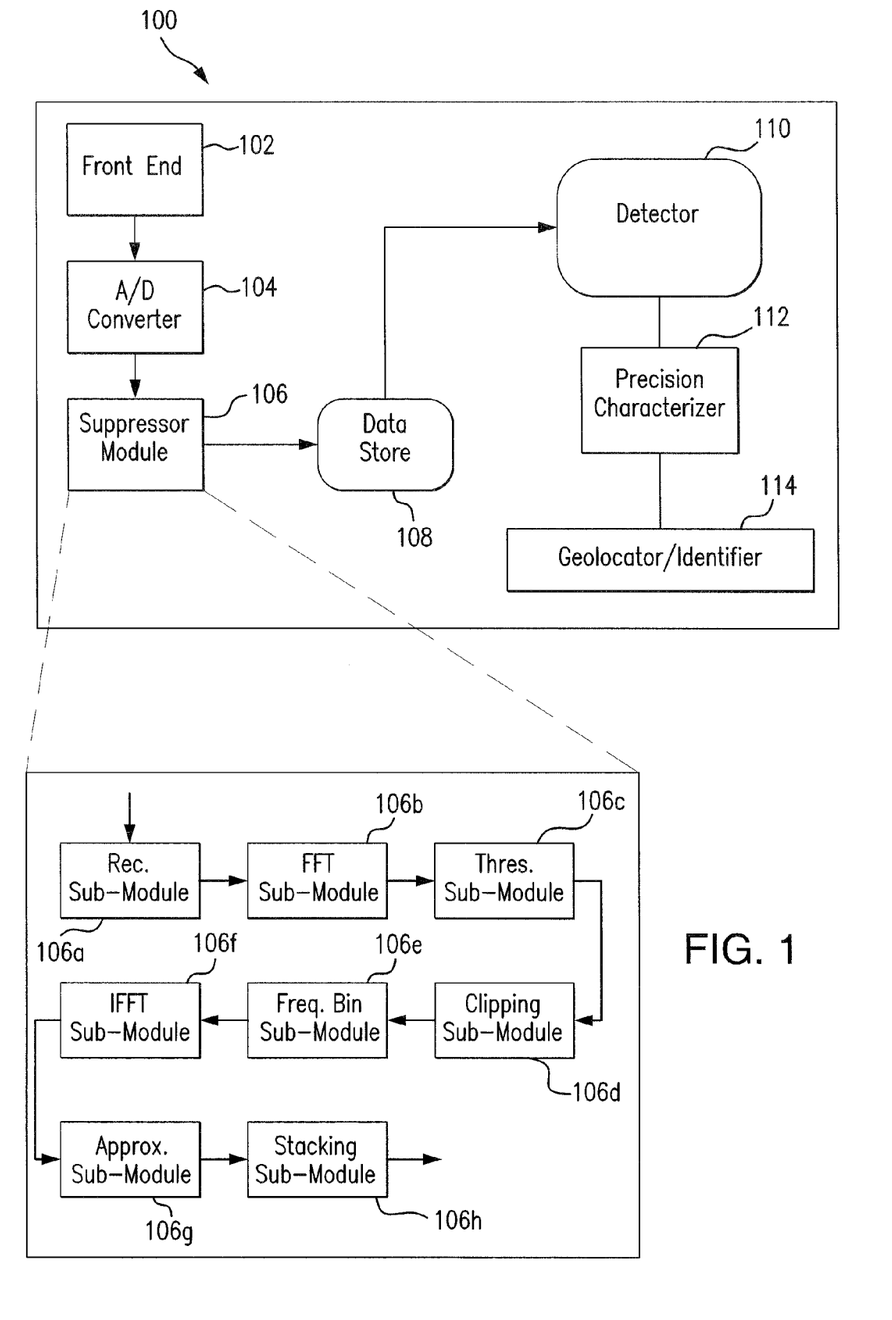
FIG. 1 is a block diagram illustrating the various components of one embodiment of a system for continuous wave interference suppression in pulsed signal processing in accordance with the teachings of the present disclosure.

Referring to FIG. 1, a block diagram illustrating the various components of one embodiment of a system 100 within which a method for continuous wave (CW) interference suppression in pulsed signal processing may be implemented. In one embodiment, system 100 may be comprised of a front-end 102, an A/D converter 104, a suppressor module 106, a data store 108, a detector 110, a precision characterizer 112 and a geolocator/identifier 114. In this particular embodiment, front-end 102 is electrically coupled to, or otherwise in communication with, the A/D converter 104. Front-end 102 is comprised generally of standard software and hardware electronics commonly used in the industry for transmitting and receiving electronic signals. Alternatively, in another embodiment, front-end 102 may be equally comprised entirely of software residing in the memory associated with a stand-alone processing system or equally implemented in any of such other form as is generally known and practiced in the electronics and signal processing industry. The stand-alone processing system may be any suitable type of computing system implemented with a processor capable of executing computer program instructions stored in a memory.

In this particular embodiment of system 100, front-end 102 is generally operable to receive radio frequency waveforms that are present within a targeted environment and produce a corresponding output waveform. In one embodiment, front-end 102 may be configured to receive Radio Frequency (RF) waveforms that are present within a targeted environment and then down-convert them to an Intermediate Frequency (IF) waveform for further processing by the A/D converter 104. The A/D converter 104 is preferably in the form of standard hardware electronics commonly used in the industry for processing electronic communications and is operable to convert analog waveforms into corresponding digital waveforms. However, it should be understood that A/D converter 104, in other embodiments, may be implemented entirely in the form of software residing in the memory of a processing system such as described herein above. In such a case, it may be implemented so as to run in conjunction with a similarly software implemented front-end 102. It should be further understood that, in other embodiments, A/D converter 104 may be combined with front-end 102 to form one integral unit providing equivalent functionality.

The output of the A/D converter 104 is generally in the form of a digitized waveform (not shown), expressed in terms of amplitude versus time, which corresponds to the analog waveform that was initially received by the front-end 102. The digitized waveform facilitates easier downstream processing within the overall system 100. In this particular embodiment of system 100, A/D converter 104 is electrically coupled to, or otherwise in communication with, the suppressor module 106.

Figure 4:
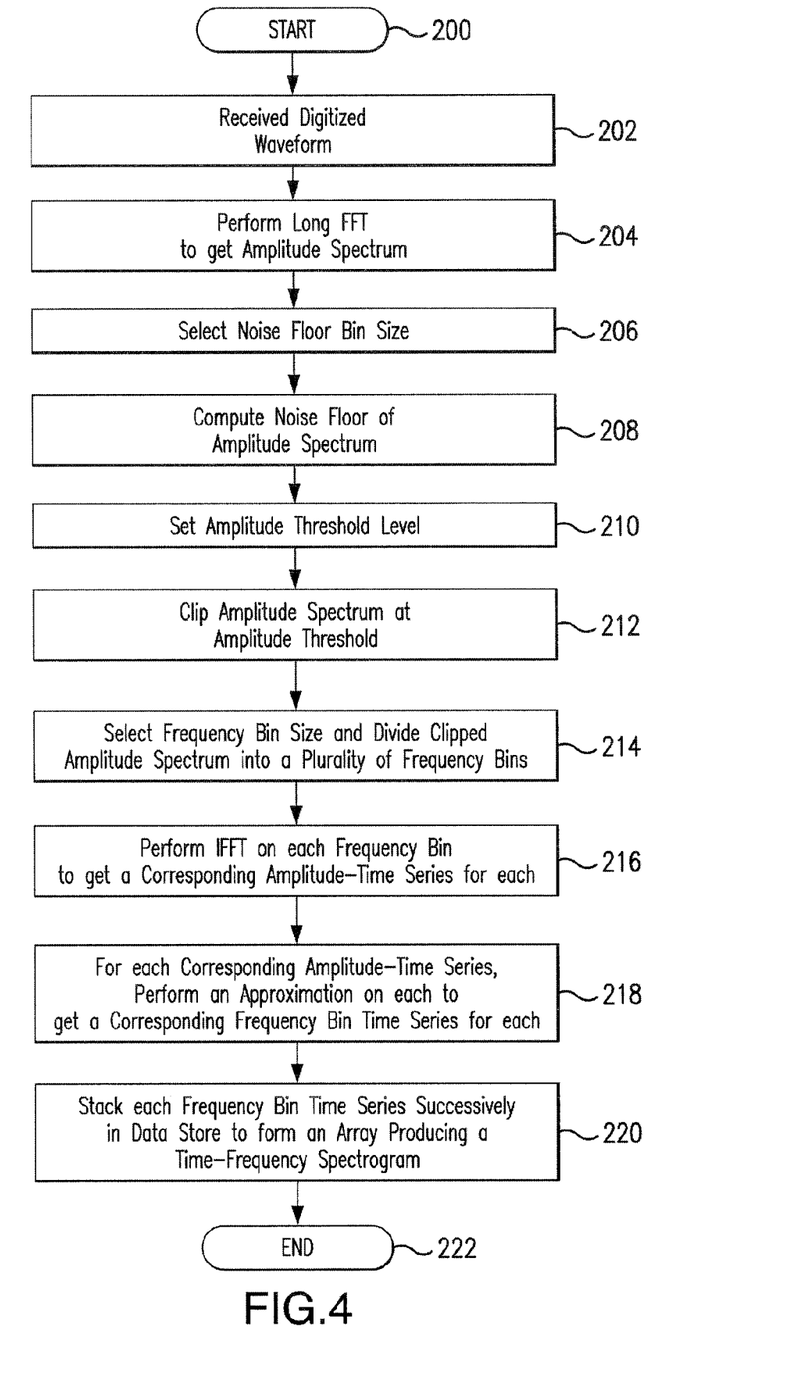
FIG. 4 is a flowchart showing one embodiment of a series of steps that may be performed by the suppressor module within the system of FIG. 1 in accordance with the teachings of the present disclosure.

The suppressor module 106 is preferably operable to receive the digitized waveform from the A/D converter 104 and further process it to suppress any CW interference that may be present and facilitate subsequent detection of desired data pulses by other downstream components within system 100. The individual steps of the digital signal processing performed by suppressor module 106 to suppress the CW interference and facilitate subsequent detection of desired data pulses will be further addressed in detail below with reference to FIG. 4. In one embodiment, the suppressor module 106 may be further comprised of a receiver sub-module 106a, an FFT sub-module 106b, a threshold sub-module 106c, a clipping sub-module 106d, a frequency bin sub-module 106e, an IFFT sub-module 106f, an approximation sub-module 106g and a stacking sub-module 106h, all of which being in such operable communication with each other within suppressor module 106 so as to perform the processing steps as shown in FIG. 4.

These sub-modules 106a-106h all form modules, or otherwise portions, within the suppressor module 106 that perform certain aspects of the overall signal processing to be performed on the digitized waveform. In one embodiment, the suppressor module 106, including all of its sub-modules 106a-106h, may be implemented in the form of one or more Field Programmable Gate Array (FPGA) chip devices having the instruction sets for the digital processing pre-programmed, or otherwise burned, into the FPGA(s). Alternatively, in other embodiments, suppressor module 106, including all of its sub-modules 106a-106h, may be implemented comprised entirely of one or more software modules residing in the memory associated with a processing system such as described herein or may be implemented in any other generally known and practiced form in the electronics and signal processing industry such as, for example, in the form of digital signal processors (DSPs) or application-specific integrated circuits (ASICs). Still further, in other embodiments, suppressor module 106, including all of its sub-modules 106a-106h, may be implemented in the form of any combination of FPGAs and software using various industry commonly known combination and decombination techniques. The suppressor module 106 may then be further electrically coupled to, or otherwise in communication with, the data store 108 and further operable to transmit and save data to the data store 108 in a manner forming a successively stacked array representing a time-frequency spectrogram.

The data store 108 is preferably operable to store data output from the suppressor module 106 and make it available for access by the detector 110. The data store 108 may be in the form of any suitable type of data storage device commonly available in the industry and suitable for providing data reading and writing capabilities in a computer readable format. In one embodiment of system 100, data store 108 may be in the form of a storage drive containing memory for reading data from and writing data to and may include any one or combination of memory elements, such as random access memory (RAM), tape, compact disc read/write (CD-RW), disk, diskette, cartridge, or the like. Alternatively, in other embodiments, data store 108 may be in the form of any of such memory elements resident within the suppressor module 106 or any of such memory elements that may be resident within a stand-alone processing system such as previously described herein above. The data store 108 is also preferably electrically coupled to, or otherwise in communication with, the detector 110.

In one embodiment, the detector 110 may be operable to retrieve, read and analyze data stored in data store 108 to generate a time-frequency spectrogram image (See FIG. 3) and perform a coarse detection of pulses. In one embodiment, detector 110 may be in the form of any imaged based detector commonly known in the industry and suitable for pulse detection wherein an image background is determined and pixels exceeding a threshold are found. In general, these pixels are then typically tied together to form coarse pulse descriptor words (PDWs). Typical examples of imaged based detectors are generally implemented in the form of FPGA chip devices. Alternatively, in other embodiments, detector 110 may be equally implemented comprised entirely of software residing in the memory associated with a processing system such as described herein above or equally implemented in any of such other form as is generally known and practiced in the electronics and signal processing industry. Depending on the requirements of the particular application at hand, system 100 may further include a precision characterizer 112. In such instances, detector 110 may then be further electrically coupled to, or otherwise in communication with, the precision characterizer 112.

In one embodiment, precision characterizer 112 is preferably operable to receive the PDWs, along with an identical sample of the digitized and processed waveform output from the clipping sub-module 106d within the suppressor module 106, and perform fine tuning, precise measurements, and modulation characterization. In one embodiment, the precision characterizer 112 may be implemented in the form of an FPGA. Alternatively, in another embodiment, precision characterizer 112 may be implemented comprised entirely of software residing in the memory associated with a processing system such as described herein above or equally implemented in any of such other form as is generally known and practiced in the electronics and signal processing industry. Still further, depending on the requirements of the particular application at hand, system 100 may further include a geolocator 114. In such case, precision characterizer 112 may then be further coupled to, or otherwise in communication with, the geolocator 114. The geolocator 114 is preferably operable to receive the final, fine PDWs from the precision characterizer 112 and perform further processing to determine precision geographical related information. In one embodiment, geolocator 114 may be implemented in the form of software residing in the memory associated with a processing system such as described herein. Alternatively, in another embodiment, geolocator 114 may be implemented in the form of one or more FPGAs or any combination of FPGAs and software using industry commonly known combination and decombination techniques, or equally implemented in any of such other form as is generally known and practiced in the electronics and signal processing industry.

Figure 2:
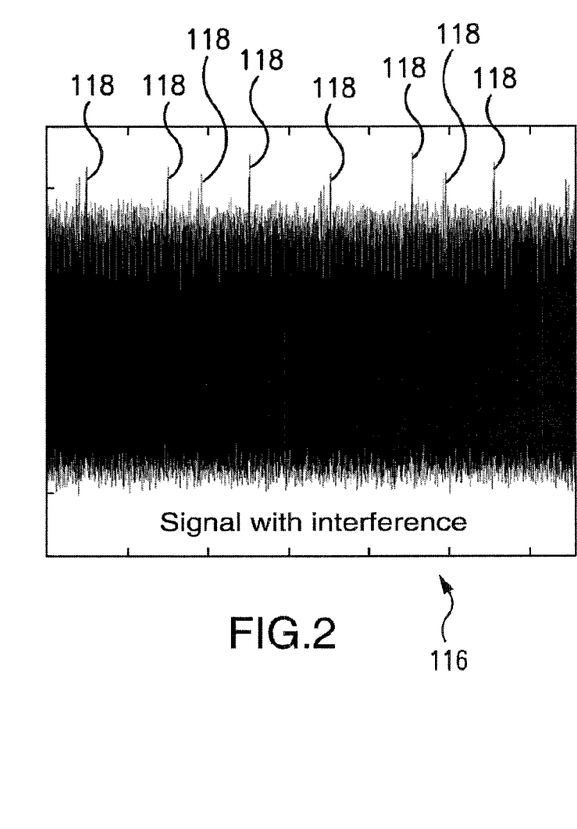
FIG. 2 is a graphical representation of an amplitude spectrum having continuous wave interference signals present.
Figure 3:
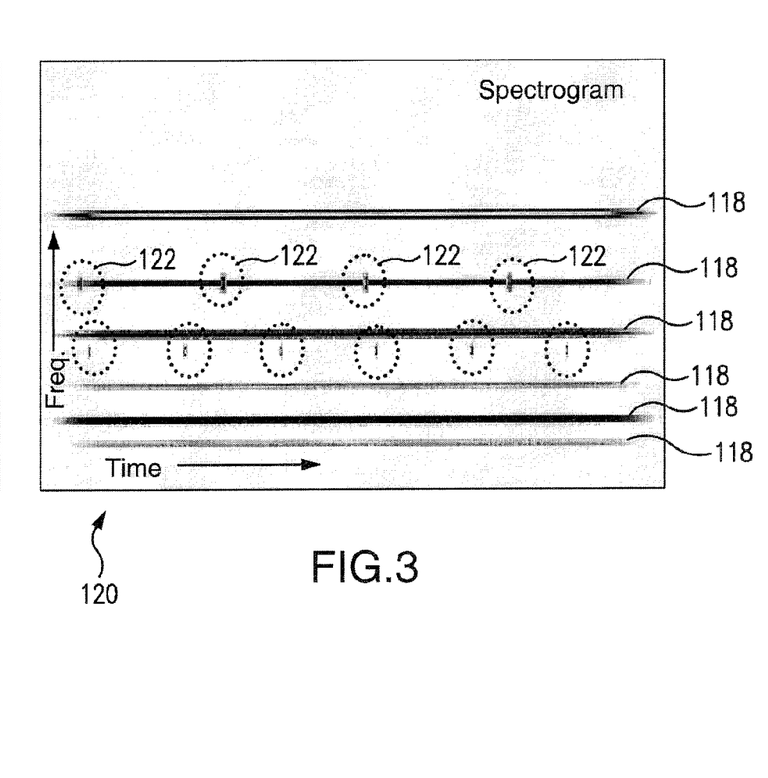
FIG. 3 is a graphical representation of a time-frequency spectrogram showing detected interference signals along with data pulses of interest obtained from the amplitude spectrum of FIG. 2 through subsequent digital signal processing.

In referring now to FIG. 2, a graphical representation can be seen of an amplitude spectrum 116 having interference signals 118 present. When CW suppression processing is not utilized and an amplitude spectrum 116 is subsequently processed through standard industry image detectors, a corresponding time-frequency spectrogram 120 of the type shown in FIG. 3 is typically produced where both data pulses 122 and interference signals 118 are detected. The CW suppression method taught by the present disclosure, will efficiently remove such interference signals 118 from the amplitude spectrum 116 and its corresponding time-frequency spectrogram 120 to thereby allow clear detection of the data pulses 122.

Figure 5:
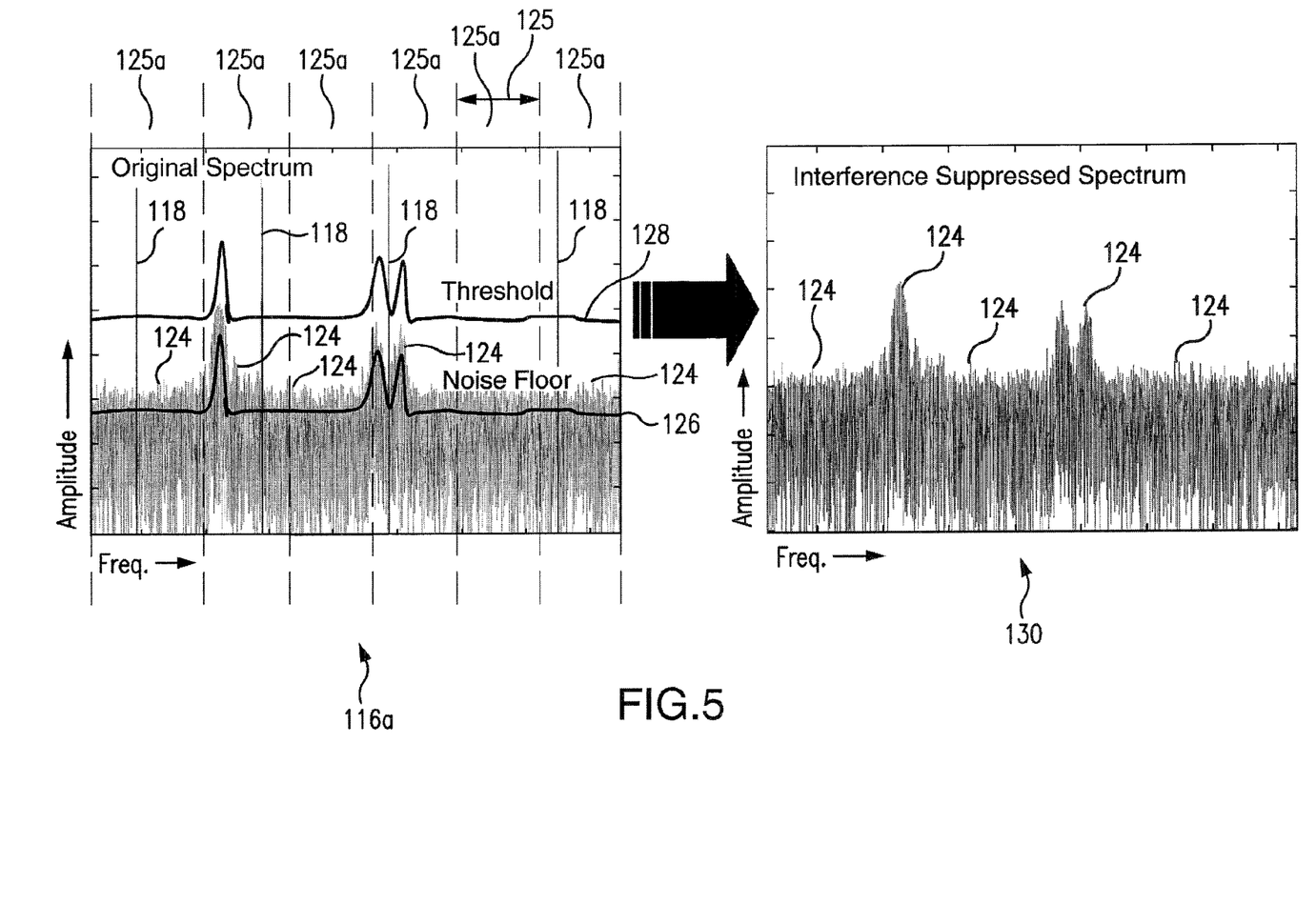
FIG. 5 is a graphical representation of an amplitude spectrum obtained from a digitized waveform before and after being clipped by the system of FIG. 1 to suppress the interference signals in accordance with the teachings of the present disclosure.

In referring now to FIG. 4, a flow chart can be seen showing the details of one embodiment of a series of steps that may be performed by suppressor module 106 to carry out CW suppression in accordance with the teachings of the present disclosure. At step 200, the process is initiated. The process may be initiated by applying power to and performing any suitable bootstrapping operations to system 100. At step 202, receiver sub-module 106a receives the digitized waveform from the A/D converter 104 and transmits it to the FFT sub-module 106b. At step 204, the FFT sub-module 106b performs a long Fast Fourier Transform on the digitized waveform to obtain a corresponding amplitude spectrum 116a having a plurality of positive frequency points 124 (See FIG. 5, illustrating amplitude spectrum 116a at a high resolution) and transmit such to the threshold sub-module 106c. In one embodiment, sub-module 106b may perform a long Fast Fourier Transform using the general purpose FFT developed by Takuya OOURA. However, it should be understood that other embodiments may utilize one of any number of other FFT algorithms generally known and commonly used in the digital signal processing industry to perform long Fast Fourier Transforms.

In step 206, a noise floor bin size 125 is selected and applied to the amplitude spectrum 116a by the threshold sub-module 106c. In one embodiment, the noise floor bin size 125 may be automatically selected by way of a fixed noise floor bin size 125 already pre-programmed into the threshold sub-module 106c based upon the nature of the signal environment that system 100 is to be utilized in. Alternatively, another embodiment may prompt a user of system 100 to input a specific noise floor bin size 125 during operation. More particularly and for example, a noise floor bin size 125 of 25 kHz may be selected for regular communication applications where there may be heavy CW interference present. For other applications requiring a large frequency bandwidth of detection or applications at higher frequencies where there may be less CW interference present, a noise floor bin size 125 of 250 kHz-5 MHz may be selected.

At step 208, the noise floor level 126 (See FIG. 5) of the amplitude spectrum 116a is computed within threshold sub-module 106c. In step 208, the noise floor level 126 may be computed in one embodiment by way of dividing up the amplitude spectrum 116a into a plurality of noise floor bins 125a and computing the noise floor bin level for each noise floor bin 125a across the amplitude spectrum 116a. In one embodiment, the noise floor bin level may be computed using a moving averages technique. Alternatively, another embodiment may compute the noise floor bin level using a polynomial fitting technique. However, it should be understood that any number of other generally known and commonly used computing techniques may equally be used to compute the noise floor bin level.

At step 210, the amplitude threshold level 128 is set. In one embodiment, the amplitude threshold level 128 may be automatically set by way of being fixed and pre-programmed into the threshold sub-module 106c based upon the specific application at hand as well as the signal environment that system 100 is to be utilized within. Alternatively, another embodiment may prompt a user of system 100 to set the amplitude threshold level 128 by inputting a specific amplitude threshold level 128 in real-time during operation of system 100 based upon guidance criteria such as the specific application at hand and the targeted signal environment.

At step 212, amplitude spectrum 116a is clipped to obtain a clipped amplitude spectrum 130 (See FIG. 5) within the clipping sub-module 106d. In one embodiment, the amplitude spectrum 116a may be clipped by, for all positive frequency points 124 having an amplitude level equal to or exceeding the amplitude threshold level 128, setting such respective amplitude levels equal to zero. Alternatively, another embodiment may implement the clipping by way of, for all positive frequency points 124 having an amplitude level equal to or exceeding the amplitude threshold level 128, setting such respective amplitude levels equal to the noise floor level 126. Still further, another embodiment may utilize noise floor bins 125a in its computation of the noise floor level 126 and may implement the clipping by way of, for all positive frequency points 124 having an amplitude level equal to or exceeding the amplitude threshold level 128, setting such respective amplitude levels equal to the noise floor bin level of the particular noise floor bin 125a wherein such respective positive frequency point 124 resides. In referring to FIG. 5, the clipped amplitude spectrum 130 can readily be seen showing the absence of the interference signals 118 since having been clipped.

Figure 6:
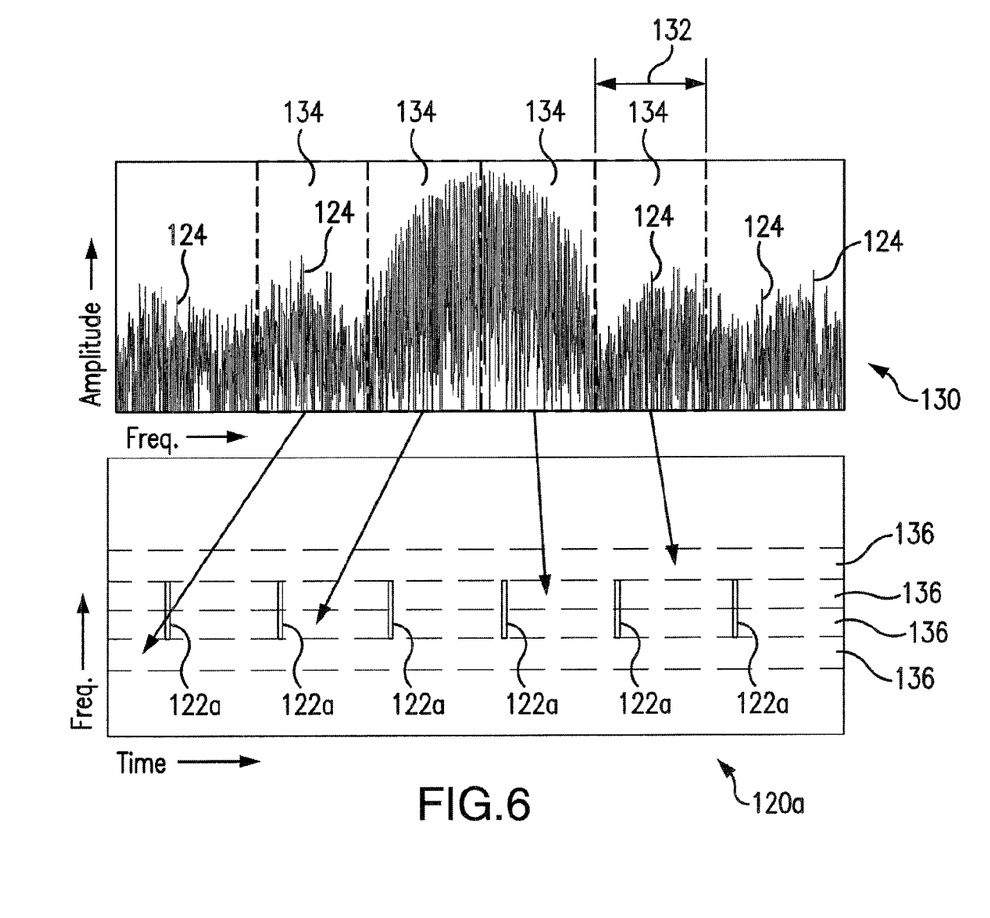
FIG. 6 is a graphical representation of a clipped amplitude spectrum being divided up into frequency bins and correlating such to individual frequency-bin-time series stacked successively to form a time-frequency spectrogram and showing detected data pulses therein within one embodiment of the system of FIG. 1 in accordance with the teachings of the present disclosure.

For step 214, reference should be made to FIG. 6. At step 214, the frequency bin sub-module 106e first selects a frequency bin size 132 then divides the clipped amplitude spectrum 130 based upon the frequency bin size 132 into a plurality of frequency bins 134, each having a center frequency. In one embodiment, the frequency bin size 132 may be automatically selected by way of being fixed and pre-programmed into the frequency bin sub-module 106e based upon system 100 application specific factors. Alternatively, another embodiment may implement the selection of a frequency bin size 132 by way of prompting a user of system 100 to input a specific frequency bin size in real-time during operation of system 100 based upon specific factors identified by the user in real-time. More particularly, frequency bin size 132 is largely dependent upon the types of signals one is trying to detect, the interference density of the environment that system 100 is monitoring, and the bandwidth of the targeted signals.

For example, when detecting radar related signals, typically low sensitivities are needed and, hence, a frequency bin size 132 of 10 MHz may be sufficient to achieve the detection. However, in contrast, if system 100 is being configured to perform a wide-area search for various signals, a high sensitivity may be necessary and, hence, a frequency bin size 132 on the order of 1 KHz may be required. However, it should be understood that the frequency bin size 132 may vary drastically from one application to another depending on the aforementioned factors and the user's goals. Once the frequency bin size 132 has been selected, the frequency bin sub-module 106e divides up the clipped amplitude spectrum 130 into a plurality of frequency bins 134 as can be seen in FIG. 6.

At step 216, the plurality of frequency bins 134 are processed by the IFFT sub-module 106f by way of performing an Inverse Fast Fourier Transform (IFFT) on only the positive frequency points 124 (for clarity sake, only a few of the positive frequency points 124 in FIG. 6 have been numbered) within each frequency bin 134 in a successive piece-wise manner to obtain a respective amplitude-time series for each frequency bin 134. In one embodiment, IFFT sub-module 106f may utilize an IFFT in the form of the Cooley-Tukey IFFT algorithm. However, it should be understood that other IFFT algorithms generally known and commonly used in the communications industry may equally be utilized in accordance with the teachings of the present disclosure.

Once step 216 is complete and successive amplitude-time series have been obtained for each frequency bin 134 in the clipped amplitude spectrum 130, the process moves to step 218. At step 218, an approximation is performed within the approximation sub-module 106g on each amplitude-time series to obtain a corresponding frequency bin time series 136. In one embodiment, the approximation sub-module 106g may perform an approximation on each amplitude-time series by way of assigning to each a frequency value equal to the center frequency of the frequency bin 134 from which the respective amplitude-time series resulted. However, it should be understood by those skilled in the signal processing art that other forms of approximation may be implemented to associate a frequency value with each amplitude-time series to obtain the corresponding frequency bin time series 136.

At step 220, stacking sub-module 106h collects the corresponding frequency bin time series 136 and produces a time-frequency spectrogram 120a as seen in FIG. 6. In one embodiment, stacking sub-module 106h may operate to successively stack each of the corresponding frequency bin time series 136 in an array in memory within the data store 108 to produce the time-frequency spectrogram 120a. From the data store 108, the array in memory may then be accessed by the detector 110 to display the time-frequency spectrogram 120a and detect the data pulses 122a within. At step 222 the method for CW interference suppression in accordance with the teachings of the present disclosure ends.

In particular embodiments, the series of steps that may be performed by the suppressor module 106 within system 100 may encompass the following example logic:

```
\\begin main program\\
 (1) set wfm = the signal array containing the digitized waveform;
 (2) spectrum = fft(wfm);
 (3) compute df (frequency bin size in spectrum)
     from dt (time increment for wfm)
 (4) set nfb = desired noise floor bandwidth / df;
     \\dependent on the signal environment\\
 (5) set inr = desired interference to noise ratio;
     \\dependent on the signal environment\\
 (6) filtered_spectrum = cwis(spectrum, nfb, inr);
     \\delete interfering CW signals\\
 (7) set freq_bins = desired number of frequency bins in spectrogram;
 (8) specgram = fastspectrogram(filtered_spectrum,freq_bins);
 (9) use specgram to determine coarse_pulse_parameters (time_start,
pulse_width, frequency_range) through image processing;
 (10) optional: pass coarse_pulse_parameters and wfm to a fine pulse
characterization routine;
 (11) report pulse parameters;
\\end main program\\
\\begin cwis\\
function cwis(spectrum, df, nbf, inr)
\\ where spectrum = unfiltered spectrum \\
\\         df        = bin size of spectrum in Hz \\
\\         nbf       = number of bins in noise floor bandwidth \\
\\         inr       = maximum interference to noise floor ratio \\
noise_floor = compute local noise floor array of spectrum over nbf bins;
threshold      = noise_floor + inr;
for every point in the spectrum do
    if (point > corresponding point in threshold array) then
        point in filtered_spectrum = point in noise_floor;
    else
        point in filtered_spectrum = point in spectrum;
    end if;
end for;
return (filtered_spectrum);
\\ end cwis \\
\\ begin fastspectrogram \\
function fastspectrogram (spec, fb)
\\ where spec = input spectrum \\
\\       fb     = number of frequency bins in output spectrogram \\
set num_iffts = length(spec) / fb / 2;
for num_iffts do
    short_spec = next fb points in spec;
    short_row = ifft(short_spec);
    "stack" short_row into spectrogram (a 2D matrix);
end do;
return(spectrogram);
\\ end fastspectrogram \\
```

Figure 7:
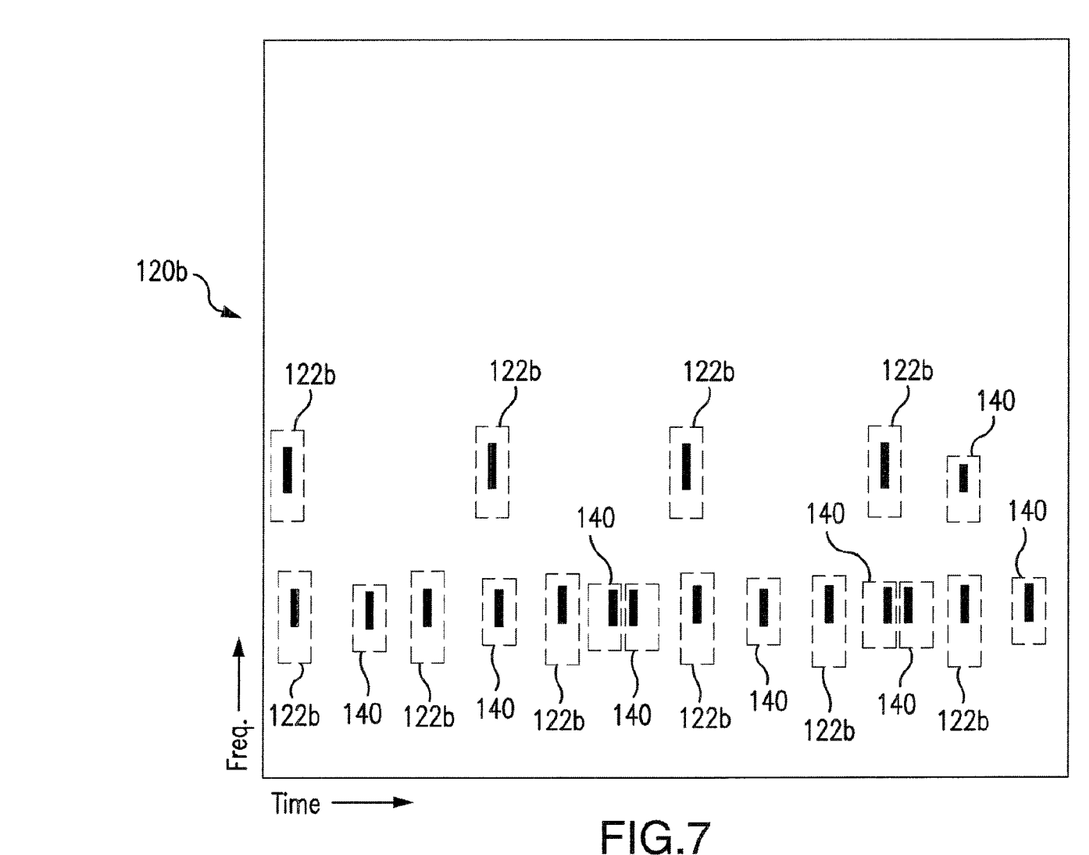
FIG. 7 is a graphical representation of a time-frequency spectrogram showing correctly detected data pulses as well as falsely detected pulses caused by the Gibbs Phenomenon.

In referring now specifically to FIG. 7, a graphical representation of a time-frequency spectrogram 120b showing the correctly detected data pulses 122b as well as detected false pulses 140 caused by the Gibbs Phenomenon that typically occur and are prevalent in current CWIS systems. These false pulses 140 are caused by the Gibbs Phenomenon, which results from processing a signal which is not infinitely long. The end effect is a two-fold problem with false pulses 140, as shown in FIG. 7, typically occurring due to ringing at the ends of the data pulses 122b and new pulses being created due to interpulse ringing and wrap-around. These new pulses appear to be present but are really not there. The current CWIS systems generally known in the industry today just live with these problems and compensate for them by performing additional post-processing on the data.

Figure 8:
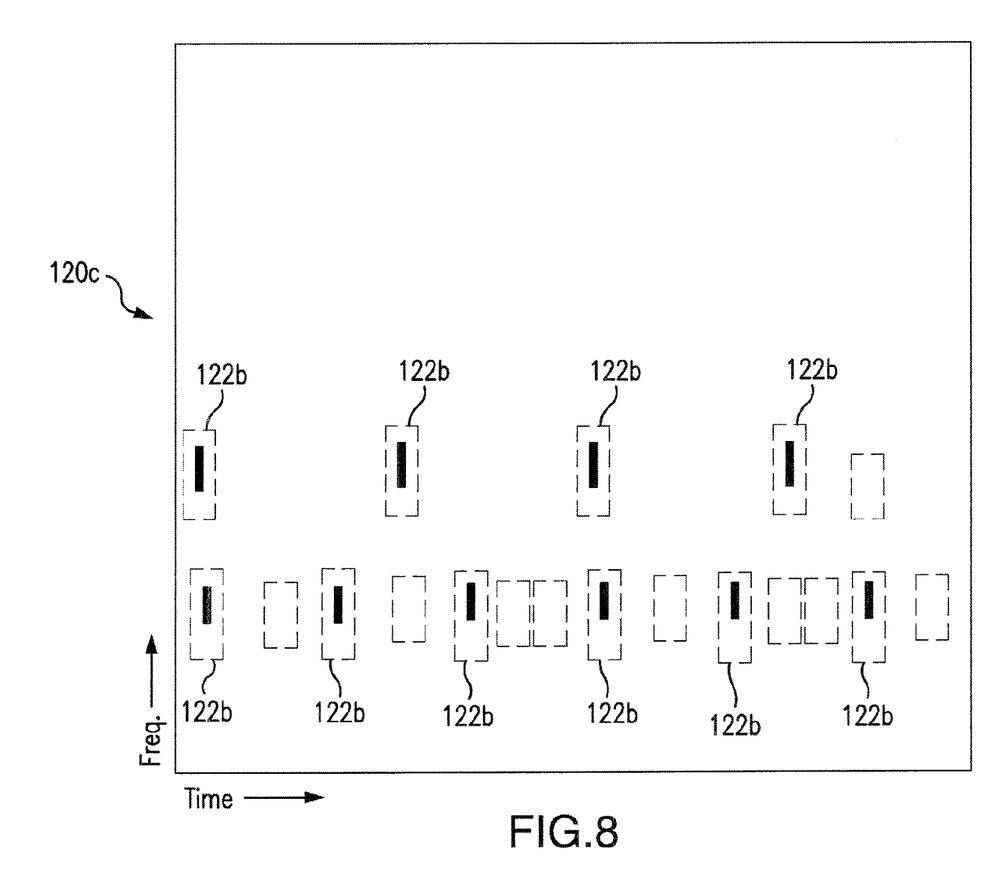
FIG. 8 is a graphical representation of a time-frequency spectrogram resulting from the application of the teachings of the present disclosure illustrating correctly detected data pulses as well as the absence of the falsely detected pulses caused by the Gibbs Phenomenon that were previously present in FIG. 6.

However, in contrast, with system 100 implementing a suppression module 106 operable with a CWIS method in accordance with the teachings of the present disclosure and processing the same signals, it successfully removes such false pulses 140 and detects only the real data pulses 122b as illustrated in the time-frequency spectrogram 120c in FIG. 8.

The present disclosure includes that contained in the appended claims, as well as that of the foregoing description. Although this disclosure has been described in its preferred form in terms of certain embodiments with a certain degree of particularity, alterations and permutations of these embodiments will be apparent to those skilled in the art. Accordingly, it is understood that the above descriptions of exemplary embodiments does not define or constrain this disclosure, and that the present disclosure of the preferred form has been made only by way of example and that numerous changes, substitutions, and alterations in the details of construction and the combination and arrangement of parts may be resorted to without departing from the spirit and scope of the invention.

What is claimed is:

1. A method for suppressing interference signals within a digitized waveform to allow detection of data pulses contained therein comprising the steps of:
   obtaining from the digitized waveform an amplitude spectrum having a plurality of positive frequency points each having a respective amplitude level, the digitized waveform received by a receiver sub-module of a suppressor module;
   setting, with a threshold sub-module of the suppressor module, an amplitude threshold level;
   clipping, with a clipping sub-module of the suppressor module, said amplitude spectrum to obtain a clipped amplitude spectrum;
   dividing, with a frequency bin sub-module of the suppressor module, said clipped amplitude spectrum into a plurality of frequency bins based on a frequency bin size;
   obtaining, with an IFFT sub-module of the suppressor module, from the positive frequency points within each frequency bin a respective amplitude-time series for each frequency bin;
   performing, with an approximation sub-module of the suppressor module, an approximation on each of said respective amplitude-time series to obtain for each a corresponding frequency bin time series; and
   stacking, with a stacking sub-module of the suppressor module, said corresponding frequency bin time series successively to form a time-frequency spectrogram thereby suppressing the interference signals and allowing detection of the data pulses.

2. The method of claim 1, further comprising the step of analyzing said time-frequency spectrogram with an image-based detector to detect the data pulses.

3. The method of claim 1, wherein the step of obtaining an amplitude spectrum comprises performing a Fast Fourier Transform (FFT) on the digitized waveform and wherein the step of obtaining a respective amplitude-time series comprises successively performing an Inverse Fast Fourier Transform (IFFT) on the positive frequency points within each frequency bin.

4. The method of claim 1, wherein the step of clipping said amplitude spectrum comprises, for each of the positive frequency points whose respective amplitude level is equal to or exceeds said amplitude threshold level, the step of setting each such respective amplitude level equal to zero.

5. The method of claim 1, further comprising the steps of selecting a noise floor bin size, dividing said amplitude spectrum into a plurality of noise floor bins, and computing a noise floor bin level for each noise floor bin.

6. The method of claim 5, wherein the step of clipping said amplitude spectrum comprises, for each of the positive frequency points whose respective amplitude level is equal to or exceeds said amplitude threshold level, the step of setting each such respective amplitude level equal to the noise floor bin level of the respective noise floor bin where such positive frequency point resides.

7. The method of claim 1, wherein each of said plurality of frequency bins has a center frequency and wherein the step of performing an approximation comprises assigning, to each of said respective amplitude-time series, a frequency value equal to the center frequency of the frequency bin from which said respective amplitude-time series resulted.

8. A method for suppressing interference signals within a digitized waveform to allow detection of data pulses contained therein comprising the steps of:
  obtaining from the digitized waveform an amplitude spectrum having a plurality of positive frequency points each having a respective amplitude level, the digitized waveform received by a receiver sub-module of a suppressor module;
  setting, with a threshold sub-module of the suppressor module, an amplitude threshold level;
  clipping, with a clipping sub-module of the suppressor module, said amplitude spectrum to obtain a clipped amplitude spectrum;
  dividing, with a frequency bin sub-module of the suppressor module, said clipped amplitude spectrum into a plurality of frequency bins based on a frequency bin size, each frequency bin having a center frequency;
  obtaining, with an IFFT sub-module of the suppressor module, from the positive frequency points within each frequency bin a respective amplitude-time series for each frequency bin;
  assigning, with an approximation sub-module of the suppressor module, to each of said respective amplitude-time series, a frequency value equal to the center frequency of the frequency bin from which said respective amplitude-time series resulted to obtain a corresponding frequency bin time series; and
  stacking, with a stacking sub-module of the suppressor module, each of said corresponding frequency bin time series successively to form a time-frequency spectrogram thereby suppressing the interference signals and allowing detection of the data pulses.

9. The method of claim 8, further comprising the step of analyzing said time-frequency spectrogram with an image-based detector to detect the data pulses.

10. The method of claim 8, wherein the step of obtaining an amplitude spectrum comprises performing a Fast Fourier Transform (FFT) on the digitized waveform and wherein the step of obtaining a respective amplitude-time series comprises successively performing an Inverse Fast Fourier Transform (IFFT) on the positive frequency points within each frequency bin.

11. The method of claim 8, wherein clipping said amplitude spectrum comprises, for each of the positive frequency points whose respective amplitude level is equal to or exceeds said amplitude threshold level, the step of setting each such respective amplitude level equal to zero.

12. The method of claim 8, wherein the step of setting an amplitude threshold level comprises the steps of initially computing a noise floor level of said amplitude spectrum and setting said amplitude threshold level above said noise floor level.

13. The method of claim 12, wherein the step of clipping said amplitude spectrum comprises, for each of the positive frequency points whose respective amplitude level is equal to or exceeds said amplitude threshold level, the step of setting each such respective amplitude level equal to said noise floor level.

14. The method of claim 12, wherein the step of computing a noise floor level is comprised of computing said noise floor level by way of utilizing at least one of a polynomial fitting technique or a moving averages technique.

15. A system for suppressing interference signals within a waveform to allow detection of data pulses contained therein comprising:
  a front-end operable to receive the waveform and produce a corresponding output waveform;
  an A/D converter operable to receive said output waveform and create a corresponding digitized waveform;
  a data store; and
  a suppressor module in communication with said data store and said A/D converter, said suppressor module further comprising:
    a receiver sub-module that receives said digitized waveform;
    an FFT sub-module that performs an FFT on said digitized waveform to obtain an amplitude spectrum having a plurality of positive frequency points each having a respective amplitude level;
    a threshold sub-module that sets an amplitude threshold level;
    a clipping sub-module that clips said amplitude spectrum to obtain a clipped amplitude spectrum;
    a frequency bin sub-module that divides said clipped amplitude spectrum into a plurality of frequency bins, each having a center frequency;
    an IFFT sub-module that successively performs an IFFT on the positive frequency points within each frequency bin to obtain an amplitude-time series for each frequency bin;
    an approximation sub-module that assigns, to each of said amplitude-time series, a frequency value equal to the center frequency of the respective frequency bin from which said amplitude-time series resulted to obtain a corresponding frequency bin time series; and
    a stacking sub-module that stacks each of said corresponding frequency bin time series successively in said data store to form a time-frequency spectrogram thereby suppressing the interference signals and allowing detection of the data pulses.

16. The system of claim 15, wherein said clipping sub-module clips said amplitude spectrum by, for each of the positive frequency points whose respective amplitude level is equal to or exceeds said amplitude threshold level, setting each such respective amplitude level equal to zero.

17. The system of claim 15, wherein said threshold sub-module sets an amplitude threshold level by way of initially computing a noise floor level of the amplitude spectrum and setting the amplitude threshold level equal to a level greater than said noise floor level.

18. The system of claim 17, wherein said clipping sub-module clips said amplitude spectrum by, for each of the positive frequency points whose respective amplitude level is equal to or exceeds said amplitude threshold level, setting each such respective amplitude level equal to the noise floor level.

19. The system of claim 15, wherein said frequency bin sub-module divides said amplitude spectrum into a plurality of frequency bins by way of applying a frequency bin size.

20. The system of claim 15, further comprising a detector module in communication with said data store operable to analyze said time-frequency spectrogram to detect the data pulses.

* * * * *